No. 623,411. Patented Apr. 18, 1899.
C. MILLHISER & C. L. A. DOEPPE.
BAG MAKING MACHINE.
(Application filed Feb. 26, 1898.)
(No Model.) 8 Sheets—Sheet 1.

WITNESSES:
Geo. C. Morrison
M. R. Jones

INVENTORS.
Clarence Millhiser,
Charles Ludwig Adolph Doeppe.
BY Stewart & Stewart
Their ATTORNEYS.

No. 623,411. Patented Apr. 18, 1899.
C. MILLHISER & C. L. A. DOEPPE.
BAG MAKING MACHINE.
(Application filed Feb. 26, 1898.)
(No Model.) 8 Sheets—Sheet 2.

Fig. 7

WITNESSES:
Geo. C. Morrison
M. R. Jones

INVENTORS
Clarence Millhiser,
Charles Ludwig Adolph Doeppe.
BY
Stuart & Stuart
ATTORNEYS.

No. 623,411. Patented Apr. 18, 1899.
C. MILLHISER & C. L. A. DOEPPE.
BAG MAKING MACHINE.
(Application filed Feb. 26, 1898.)
(No Model.) 8 Sheets—Sheet 5.

WITNESSES:

INVENTORS
Clarence Millhiser,
Charles Ludwig Adolph Doeppe.
BY
Stewart & Stewart
ATTORNEYS No. 623,411. Patented Apr. 18, 1899.
C. MILLHISER & C. L. A. DOEPPE.
BAG MAKING MACHINE.
(Application filed Feb. 26, 1898.)
(No Model.) 8 Sheets—Sheet 8.

WITNESSES:

Clarence Millhiser,
Charles Ludwig Adolph Doeppe,
INVENTORS

BY
ATTORNEYS

UNITED STATES PATENT OFFICE.

CLARENCE MILLHISER AND CHARLES LUDWIG ADOLPH DOEPPE, OF RICHMOND, VIRGINIA.

BAG-MAKING MACHINE.

SPECIFICATION forming part of Letters Patent No. 623,411, dated April 18, 1899.

Application filed February 26, 1898. Serial No. 671,827. (No model.)

*To all whom it may concern:*

Be it known that we, CLARENCE MILLHISER and CHARLES LUDWIG ADOLPH DOEPPE, citizens of the United States of America, and residents of Richmond, in the State of Virginia, have invented certain new and useful Improvements in Bag-Making Machines, of which the following is a specification.

Our invention relates to bag-making machines, and particularly to machinery for making bags for tobacco, grain, seeds, flour, &c.

In order to render clear the following description of our machine and its working, we will first give a brief outline of the manner in which our machine operates to make bags. The fabric of which the bags are to be made and which when necessary is hemmed throughout its length on both edges is for the sake of convenience wound on a reel. This reel is situated at a little distance from the machine. Upon leaving the reel the fabric passes through a guide-frame to direct its course, that side of the fabric on which is the hem being downward. It then passes under a single guide-finger, the guide-finger extending nearly across the width of the fabric, that part of the fabric extending beyond the single guide-finger being free to turn up and over the end of the said single guide-finger, thus forming the commencement of the fold. This turned-up part of the fabric then passes between the fingers of a double guide-finger which is so adjusted as to allow the fabric to make a complete fold just as it arrives at the registering-folder attached to the machine proper. These guide-fingers prevent any irregular folding, creasing, or dragging out of shape of the fabric. The registering-folder attached to the machine proper is so constructed as to allow the fabric in passing through it to adjust its two edges over one another, the inner part of the fold, which will ultimately form the bottoms of the bags, being well rounded and as yet not creased. Leaving the registering-folder the folded fabric passes on to the creasing-folder, which is situated immediately in advance of the intermittent feed-rolls. This creasing-folder is so constructed as to partly crease the inner part of the fold of the fabric and so insures its keeping its proper form as it passes through the intermittent feed-rolls. The intermittent feed-rolls, which feed the fabric to the cutting-knife, are operated by a mechanism which is so adjusted as to give to the feed-rolls that motion which shall be sufficient to feed to the cutting-knife at one time that quantity of fabric which is necessary for the formation of one bag. Immediately between the intermittent feed-rolls and the knife and close to the latter is a constantly and rapidly revolving "presenting-roll" of small diameter, which keeps the material flat after it passes the intermittent feed-rolls and prevents its buckling against the knife-blade. The function and operation of the presenting-roll will be explained more fully hereinafter. Immediately beyond the knife is a series of endless tapes or bands having an intermittent motion and which carry the portions of fabric on to the sewing-table, where each portion of fabric is in its turn fed by a pair of automatic fingers to the sewing mechanism, by which the two sides of each portion are sewed, complete bags being then formed. The bags as they leave the sewing mechanism are necessarily connected together by threads, and they now pass to a breaker, which separates the bags from one another. The bags now only need stringing (in cases where strings are used to close the necks of the bags) and turning.

Referring to the drawings, which form a part of the specification, and in which like numerals refer to like parts in the several views, Fig. 9 is a perspective view of the machine. In these three views, Figs. 7, 8, and 9, the feeding-table 19, Fig. 1, has been removed in order to allow the driving mechanism to be clearly seen. Fig.

10 is a vertical section of the knife-adjuster, presenting-roll, and feed-rolls. Fig. 11 shows in perspective a modified form of feed-arm, by using which one driving-cam can be used instead of two. Fig. 15 is a detail in perspective showing a modified form of feed-finger, by using which the feed-bands and presser-roll, Fig. 14, are done away with. Fig. 16 is a detail in perspective of the foot of the modified form of feed-finger, showing the roughened under surface. Fig. 17 is a plan.

Figures 1, 2, 3, 4, 5, 6:
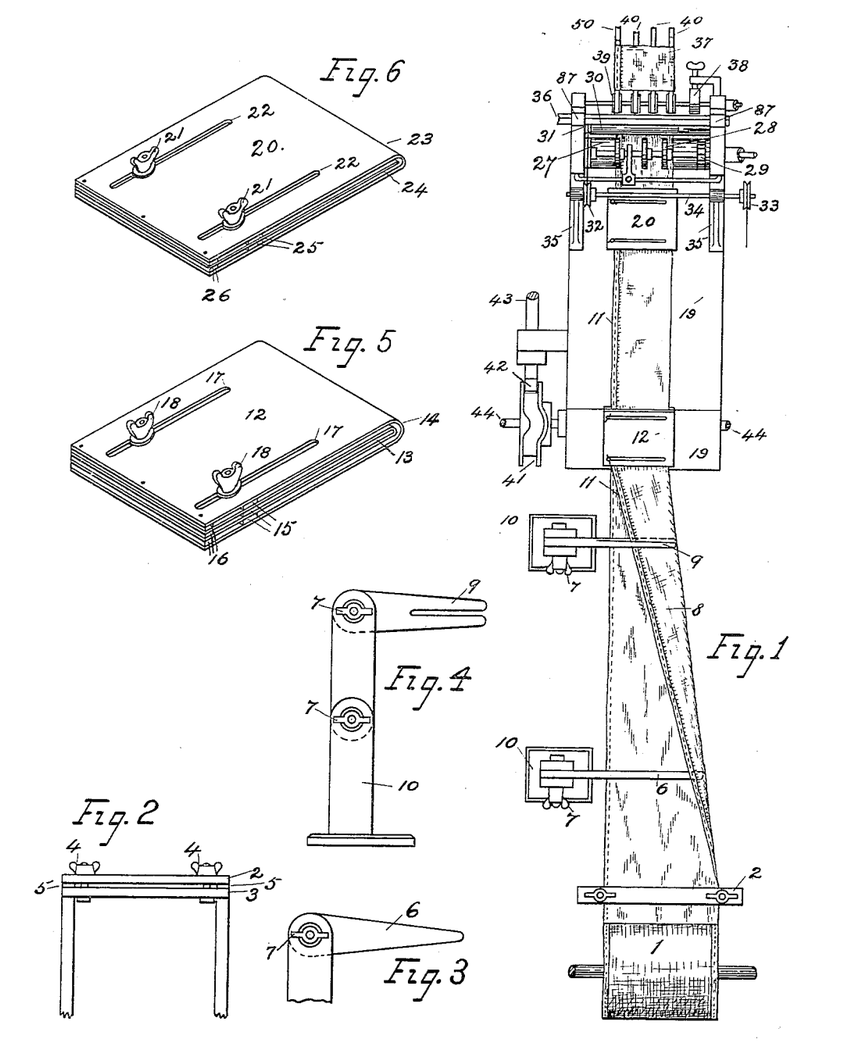
Figure 1 is a plan showing the method of folding the fabric as it is fed to the machine.
Fig. 2 shows the guide through which the fabric passes after leaving the roll 1.
Fig. 3 is a detailed view of the single guide-finger 6, Fig. 1.
Fig. 4 is a detail view of the double guide-finger 9.
Fig. 5 is a perspective view of the adjustable folder 12.
Fig. 6 is a perspective view of the adjustable folder 20.

In Fig. 1, 19 is the feeding-table, attached to which is the adjustable registering-folder 12 and the adjustable creasing-folder 20, adapted to fold the fabric 8 as it is drawn from the reel 1 by the feed-rolls 27 28 in such a manner that each portion of the folded fabric when cut off by the knives 36 shall have its edges 11, which form the mouth of the resulting bag, the one over the other and shall be ready to have its sides sewed up to form the complete bag. The adjustable registering-folder 12 consists of two plates, preferably of metal, each bent in the shape of a U and of such size that one will fit within the other, leaving a space between. This is shown clearly in Fig. 5, wherein 14 is the outer plate and 13 the inner plate. These plates are connected together at their outer ends, distance-pieces 16 being used to preserve the space between them. 15 15 15 are movable strips, which when adjusted to the size of bag to be made by means of the bolts and fly-nuts 18, which are free to move along slots 17 in each of the plates, effect the correct registering of the two edges of the folded fabric. This results from the fact that the length of the space between the plates from strip to strip is exactly equal to the width of the fabric, so that when it is drawn into the guide the two edges will be brought into position one immediately above the other. The bend of the inner plate is well rounded, and consequently the inner part of the fold of the fabric is not creased, leaving the edges of the fabric free to adjust themselves. From the adjustable registering-folder the folded fabric passes on to the adjustable creasing-folder 20. The creasing-folder differs from the registering-folder 12 in one respect only, which is that instead of the inner plate being bent double and having a rounded bend it consists of a single plate 24. In passing through this folder the two sides of the folded fabric are necessarily brought closer together and the inner part of the fold is given a slight crease, thus insuring the registration of the two edges remaining correct as the folded fabric is drawn from the folder 20 by the intermittent feed-rolls 27 and 28. After leaving the reel 1 the fabric passes through the adjustable guide, Fig. 2, which has the two guide-bars 2 and 3 and the adjustable bolts 4. 5 5 are distance-pieces. Fig. 4 shows the double guide-finger 9, which is attached to the stand 10, which is adjustable at the points 7 7. Fig. 3 shows the single guide-finger 6 attached to a similar stand with similar adjustment. The tendency of the fabric after it leaves the reel 1 on its course to the registering-folder 12 is to fold over on itself. If this were not checked and properly regulated, the fabric would leave the reel 1 irregularly, which would result in creases at the folders; but by using the single and double guide-fingers 6 and 9, as shown in Fig. 1, we are enabled to regulate the folding of the fabric.

Figure 7:
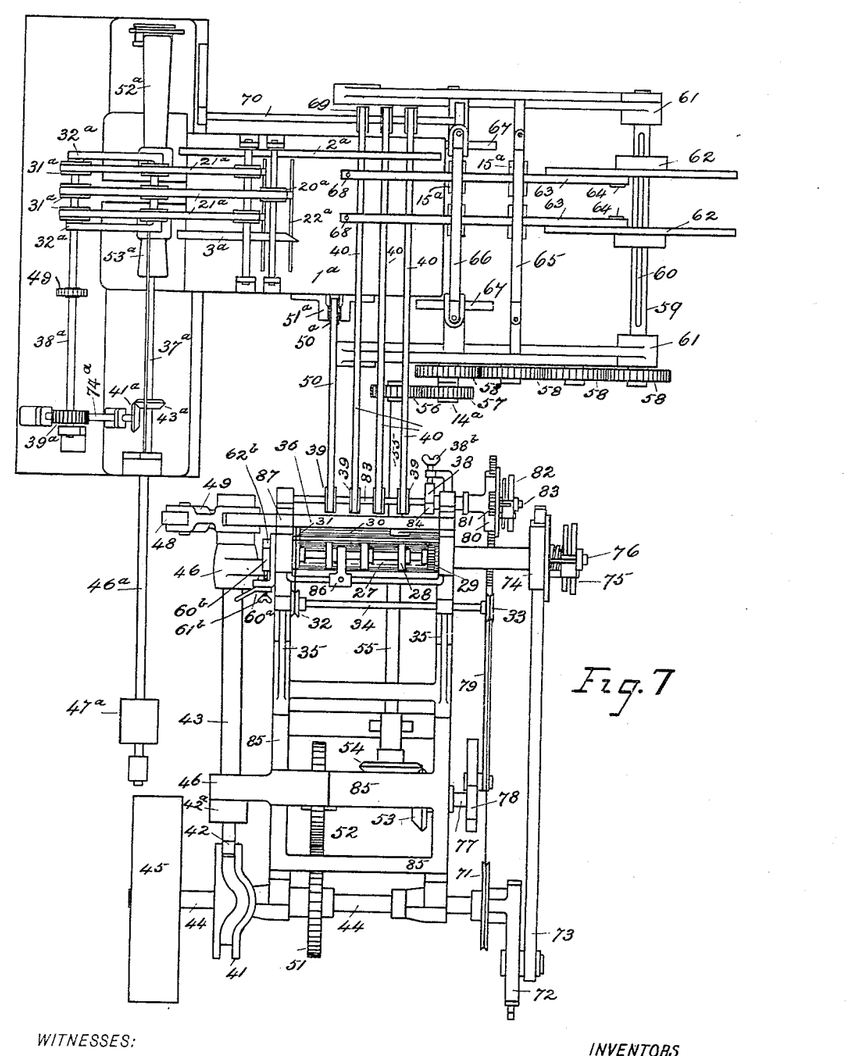
Fig. 7 is a plan of the machine.
Figure 8:
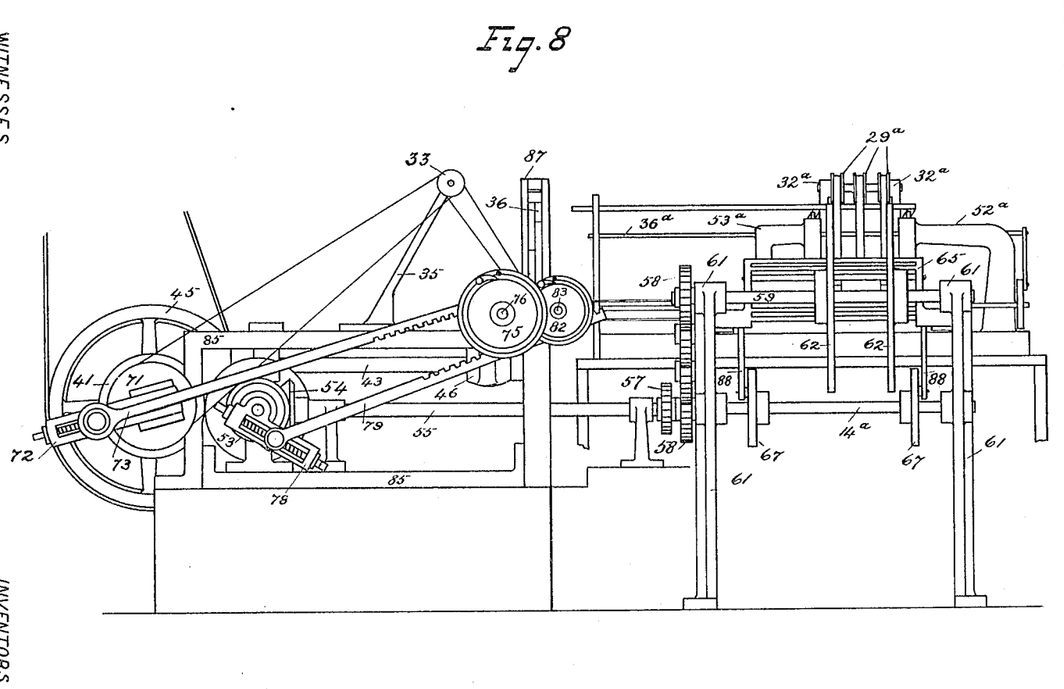
Fig. 8 is a side elevation of the machine.
Figure 13:
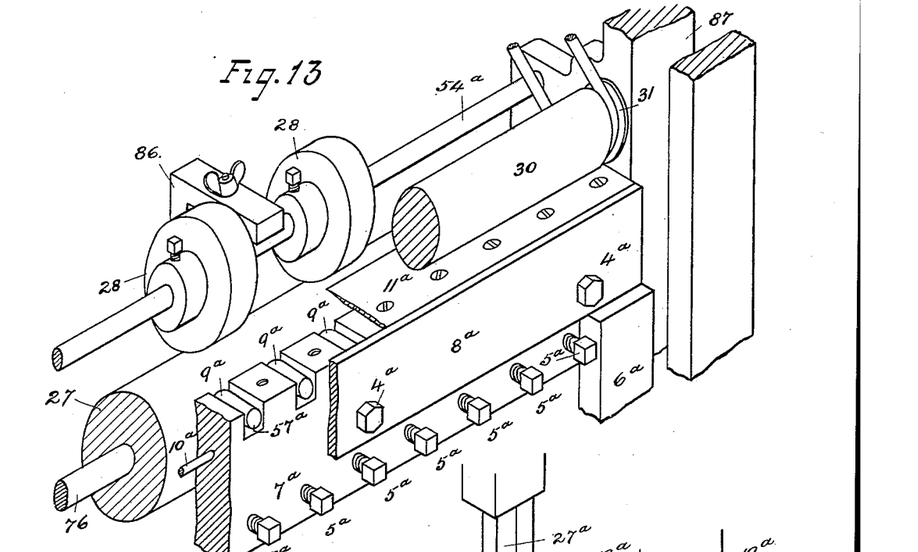
Fig. 13 is a detail in broken perspective showing the feed-rolls, presenting-roll, and knife-adjuster.

In Fig. 7, 45 is the main driving-pulley, (which can be driven in the usual way from a line-shaft,) mounted on the main shaft 44, which is carried in bearings attached to the frame or bed-plate 85. 72 is a crank (also mounted on the main shaft 44) having an adjusting device whereby its throw may be regulated with accuracy and operating the connecting-rod 73, which by means of a rack cut at its farther end (see Fig. 8) operates the intermittent silent feed-motion 75, mounted on the shaft 76, which silent feed-motion in its turn gives an intermittent motion by means of the shaft 76 to the lower feed-roll 27, which is prevented from turning in the opposite direction—that is, in the direction which is opposite to that in which it turns when feeding the fabric to the cutter—by means of the friction-brake $60^a$, which consists of the brake-shoe $60^b$, which is caused by the screw $61^b$ to bear against the disk $62^b$, which is attached to the shaft 76. On the shaft 76, which carries the lower feed-roll, is a gear-wheel 29, gearing into another gear-wheel of similar pitch, $29^b$, which is mounted on the shaft $54^a$, which carries the upper feed-rolls 28. 86 is a clamp by means of which the pressure between the upper and lower feed-rolls can be regulated. The motion of these upper feed-rolls 28 will consequently be also intermittent and will be equal to the motion of the lower feed-roll 27. Heretofore great difficulty has always been experienced in the automatic feeding of fabrics to a cutter, as the fabric, owing to its lightness of texture, tends to buckle or turn up after leaving the feed-rolls. When the fabric buckles or turns up after leaving the feed-rolls, it strikes against the blades of the cutter instead of passing between them. It will then buckle or heap up in front of the cutter, and if any part of it passes between the blades the portions cut off will be irregular in shape and of no use. Other and perhaps greater sources of trouble are lint and threads from the material, which often cause the cut edge of the strip of material to cling to the edge of the cutter. When this happens and the strip is again fed forward for the purpose of cutting off another portion, the end of the strip of material will not pass between the cutting-blades, but will buckle up, with the results explained above. To overcome these obstacles, we place between the feed-rolls and the blades of the cutter and close to the latter a presenting-roll 30. (Shown more clearly in detail in Figs. 10 and 13.) This presenting-roll, which can have a roughened surface or be covered with a material having a surface roughened sufficiently to cause the roller by friction to have a slight grip on the fabric and being driven at a higher rate of speed than the feed-rolls, puts a slight tension on the fabric after it leaves the feed-rolls, thereby preventing its buckling or creasing or its clinging to the cutters and so insuring its keeping its required form as it passes through the cutters. To operate with greatest effect, the presenting-roll should be placed as close as possible to the cutters. Consequently the distance from the center of the roll to the cutters being the measure of the effective distance of the roll from the cutters, the diameter of the roll should be small. The presenting-roll is caused to revolve by means of a cord passing over a pulley 31 at one end of it, Fig. 10, the cord also passing over the pulley 32 on the counter-shaft 34, which is carried by brackets 35 35, attached to the bed-plate or frame 85. On the counter-shaft 34 is also another pulley 33, over which passes a cord which receives its motion from the pulley-wheel 71 on the main shaft 44, Fig. 7. We do not confine ourselves to these methods of driving the intermittent feed-rolls or the presenting-roll, though we think the methods illustrated are preferable.

Referring again to Fig. 7, 41 is a cam which (through and by means of the pin 42, which is attached to the crank $42^a$, which is attached to the shaft 43, carried in the bearings 46 46, and the crank 48, which is attached to the shaft 43, the link 49, and the bell-crank $13^a$) operates the upper cutter-blade 36, which is swung between the supports 87 87 by means of the bell-crank $13^a$ and the link $12^a$. $8^a$ (see Figs. 10 and 13) is the lower cutter-blade, which is attached to the cross-bar $7^a$ by means of the bolts $4^a$. Now in the cutting of soft fabrics of light texture it is absolutely necessary that the knives should at all times cut clean and clear. In the ordinary use of a cutter the knives are constantly getting dull or out of alinement and require readjustment, and it is an extremely difficult matter to properly adjust the knives, an operation which usually consumes a considerable length of time. In order to overcome this difficulty, we use the form of adjustment shown in Figs. 10 and 13, in which $7^a$, the cross-bar to which the lower cutter-blade $8^a$ is attached, has the slots $56^a$. In these slots are swung upon the pin $10^a$ the adjusting-fingers $9^a$, which have the noses $57^a$, which rest against the cutter-blade $8^a$ near its upper edge. At the lower end of each finger and passing through the cross-bar $7^a$ are the adjusting-screws $5^a$. Upon tightening up any one of these adjusting-screws it will press against the lower end of the corresponding finger and will cause the nose of the said finger to press against the upper edge of the cutter-blade, which being elastic will give to the pressure exerted upon it by the finger and can so be adjusted at that point. It will readily be seen that by employing a number of these fingers the lower cutter-blade can be very finely adjusted and in very short time. $11^a$ is a cover-plate attached to the top surface of the cross-bar $7^a$ and forming a table over which the fabric passes as it leaves the feed-rolls 27 28 on its way to the cutters.

Referring again to Fig. 7, upon the driving-shaft 44 is the gear-wheel 51, which intermeshes with the gear-wheel 52, which is mounted upon the shaft 77. Attached to the shaft 77 is the crank 78, having an adjusting device whereby its throw may be regulated with accuracy and operating the connecting-rod 79, which by means of a rack cut at its farther end and working in the housing 80 operates the intermittent silent feed-motion 81 82, mounted on shaft 83, which silent feed-motion in its turn gives an intermittent motion by means of the shaft 83 to the pulleys 39, the shaft 83 being prevented from turning in the direction opposite to that given it by the silent feed-motion by means of the friction-shoe 38, which by means of the screw $38^b$ is caused to bear against the disk 84. Passing over and operated by the pulleys 39 are the endless bands 40, which extend across the sewing-table $1^a$ and return over the idle pulleys 69, which are mounted on the shaft 70, and also the endless band 50, which extends only as far as the sewing-table $1^a$ and returns over the idle pulley $50^a$, which is mounted in the bracket $51^a$. As the folded fabric passes through the cutters the detached portions fall upon the endless bands 40 and 50 and are carried by means of them to the sewing-table $1^a$, the crank 78 being so adjusted as to give to the intermittent silent feed-motion 81 82, and consequently to the endless bands 40 and 50, that amount of travel which may be necessary to carry the cut-off portions of fabric to the sewing-table at the proper intervals. The endless band 50 is caused to only reach and not pass over the sewing-table $1^a$ in order that that part of the detached portion of fabric which is supported by it may, when it reaches the sewing-table, be free to be engaged by the automatic feeding-fingers 68.

Referring again to Fig. 7, on the shaft 77 is the bevel-gear 53, which gears with the bevel-gear 54, which is mounted on the shaft 55. Also on the shaft 55 is the gear 56, which meshes with the gear 57 on the shaft $14^a$. Also mounted on the shaft $14^a$ is the first of a train of gear-wheels 58, which drive the shaft 59, which is supported in bearings in the frames 61 61. On the shaft 59 are mounted the cams 62 62, which by means of the cam-paths 97 and the roller 64 give to the feed-finger arms 63 63 a reciprocating motion, the said feed-finger arms passing through and being controlled as to their course by the guide-frames 65 66, which have the rollers $16^a$ and the guide-plates $15^a$. (See Fig. 9.) The cams 62 62 can be adjusted as to their distance apart on the shaft 59, their correct relative position being preserved by means of the key or feather 60. At the outer end of the feed-finger arm 63 is the finger 68, which is kept in its extreme downward position by a compression-spring 90, the cross-pin 91 preventing the finger 68 from being drawn through the arm 63. The under face of the foot of the finger 68 should be roughened in order that it may engage the detached portions of folded fabric with certainty. On the shaft $14^a$ are mounted the cams 67 67, which, operating upon the rollers attached to the rods 88 88, which rods 88 88 are attached to the guide-frame 66, give motion in a vertical direction to the said guide-frame 66.

Figure 9:
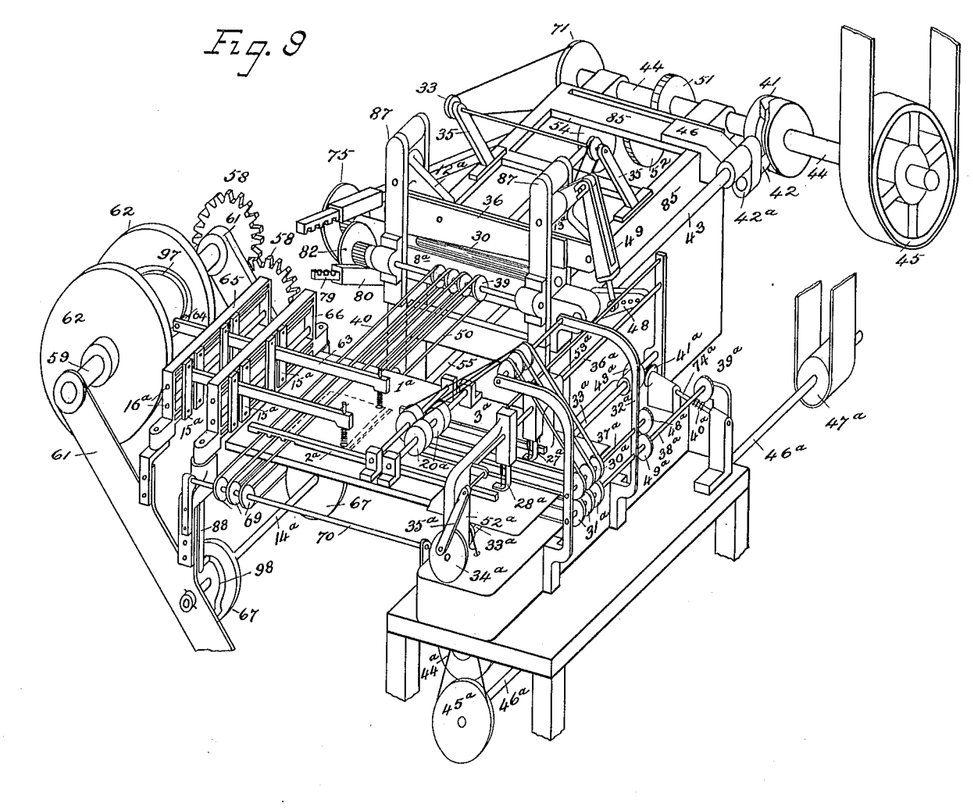
Figure 12:
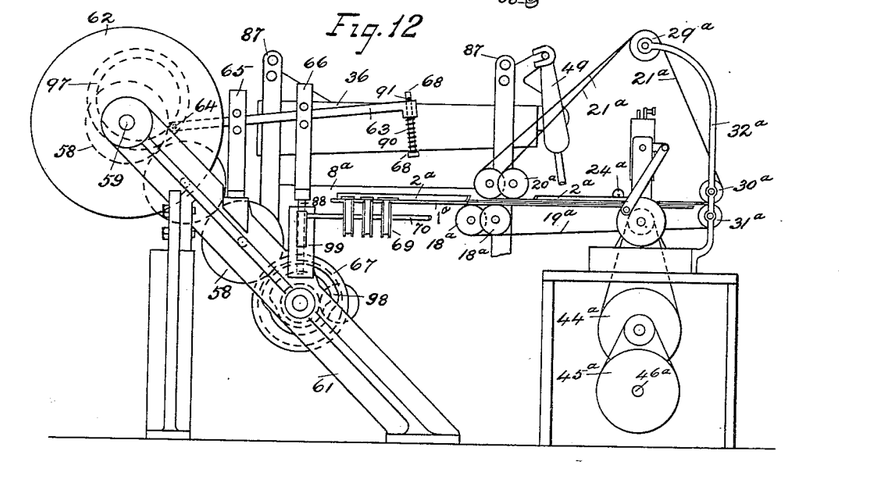
Fig. 12 is a side view of the sewing-table, showing the method of feeding the cut portions of folded fabric to the sewing mechanism.
Figure 14:
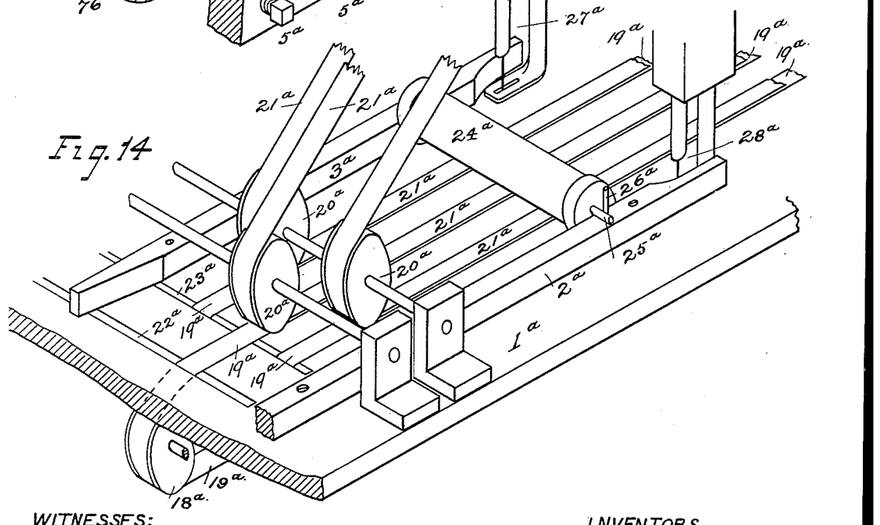
Fig. 14 is a detail in perspective showing the arrangement of feed-bands for feeding the cut portions of folded fabric to the sewing mechanism and also the presser-roll.

Referring to Figs. 9 and 12, as a detached portion of folded fabric comes beneath the feed-fingers 68 68 the latter are depressed by means of the frame 66 and the cams 67 67, and so by means of the feet having the roughened under surface and actuated by the springs 90 90 engage the detached portion of folded fabric. The cams 62 62 then give to the feed-finger arms 63 63 a forward motion, which causes the feed-fingers 68 68 to feed the detached portion of folded fabric to the feed-bands $19^a$ $21^a$, at which point the said feed-finger arms 63 63 are given motion in an upward direction by means of the frame 66 66 and the cams 67 67, thereby freeing the detached portion of the folded fabric, which now has its upward edge resting on the endless bands $19^a$ $19^a$, (see Fig. 14,) which are carried by the rollers $18^a$ $31^a$, which pass upward onto the surface of the sewing-table $1^a$ through the slots $22^a$ $23^a$. The detached portion of folded fabric is now carried forward by the bands $19^a$ until it is grasped between the said endless bands $19^a$ and the endless bands $21^a$ and is so carried forward to the sewing mechanisms $27^a$ $28^a$, which are a part of and are operated from the double-headed sewing mechanism $52^a$ $53^a$. (See Figs. 7, 8, and 9.) The endless feed-bands $19^a$, which are carried by the rollers $18^a$ $31^a$ and the endless feed-bands $21^a$, which are carried by the rollers $20^a$ $29^a$ $30^a$, and the sewing mechanisms $27^a$ $28^a$ are given motion in the following manner: $47^a$ is a pulley attached to the shaft $46^a$ and is driven by means of a belt from a line-shaft or other source of motion. (See Figs. 7, 9, and 12.) Upon the shaft $46^a$ is mounted the pulley $45^a$, from which is driven the counter-shaft carrying the pulley $44^a$, from which pulley is driven the sewing-mechanism shaft $33^a$, (see Fig. 9,) upon which is mounted the disk-wheel $34^a$, which operates the arm $35^a$ and the shaft $36^a$ to give a reciprocating motion to the needles of the sewing mechanism. Also on the sewing-mechanism shaft $33^a$ is the bevel-gear $43^a$, which gears with the bevel-gear $41^a$, which is mounted on the shaft $74^a$, upon which shaft is also mounted the worm $40^a$, which drives the worm-wheel $39^a$, which is attached to the shaft $38^a$, which carries the rollers $31^a$, which carry and give motion to the endless bands $19^a$, and the gear $49^a$, which meshes with a similar gear $48^a$, which is mounted on the shaft $37^a$, upon which shaft are mounted the rollers $30^a$, which carry and give motion to the endless bands $21^a$. It will now be seen that the portions of folded fabric as they are detached by the cutters are carried forward by the intermittently-moving endless bands 40 and 50 to the sewing-table $1^a$, where they are successively engaged by the feed-fingers 68 and by them are successively fed to the feed-bands $19^a$ and $21^a$, by which they are fed to the sewing mechanism $27^a$ $28^a$, by which the two sides of the detached portions of folded fabric are sewed up to form complete bags.

Figures 10, 11:
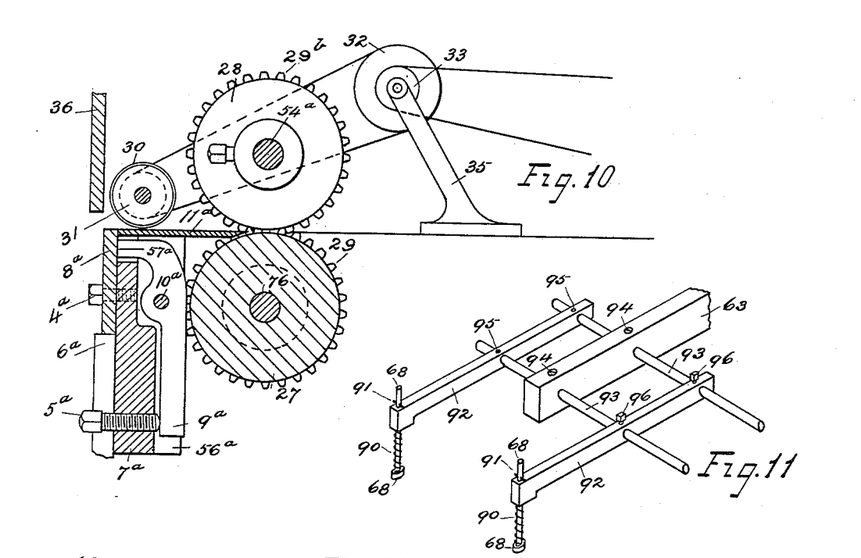

Fig. 11 shows a modified arrangement of feed-finger attachment, wherein the feed-fingers 68 68 are carried on secondary arms 92 92, which by means of the rod 93 93 are carried by a single feed-finger arm 63, thus rendering it possible to use one cam 62, Fig. 9, instead of two. In this arrangement adjustment is obtained by making one of the secondary arms 92 movable on the rods 93 93, the said secondary arm being secured in the required position by said screws 96 96. The fixed secondary arm is attached to the rods 93 93 by means of the pins 95 95, the rods 93 93 being themselves secured in the arm 63 by means of the screws 94 94.

Figures 15, 16:
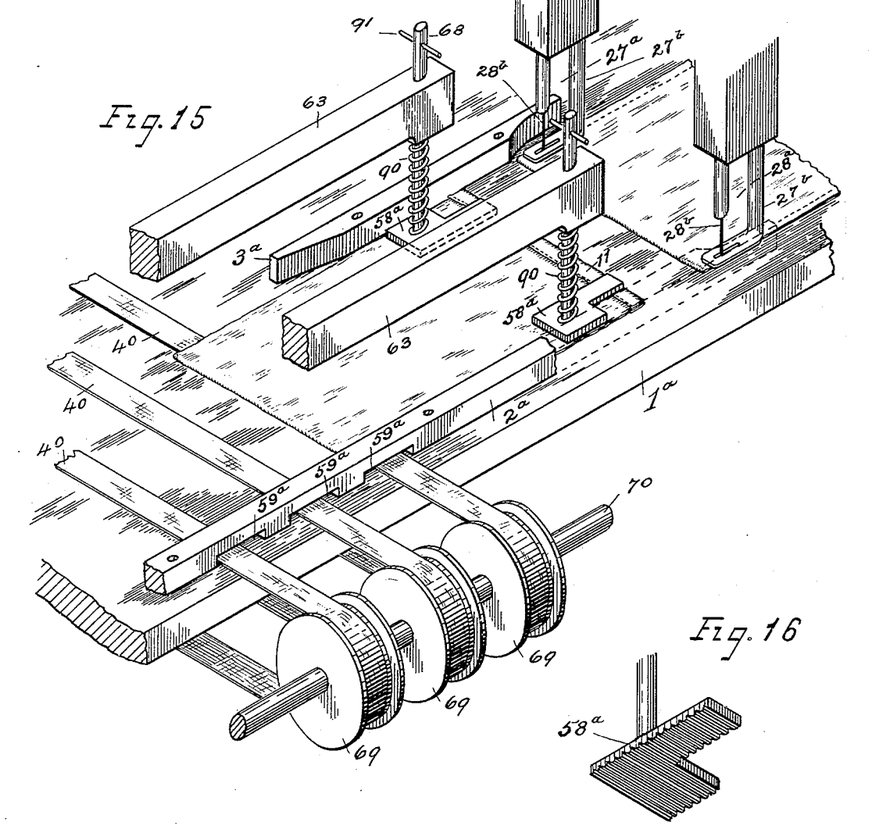
Figure 17:
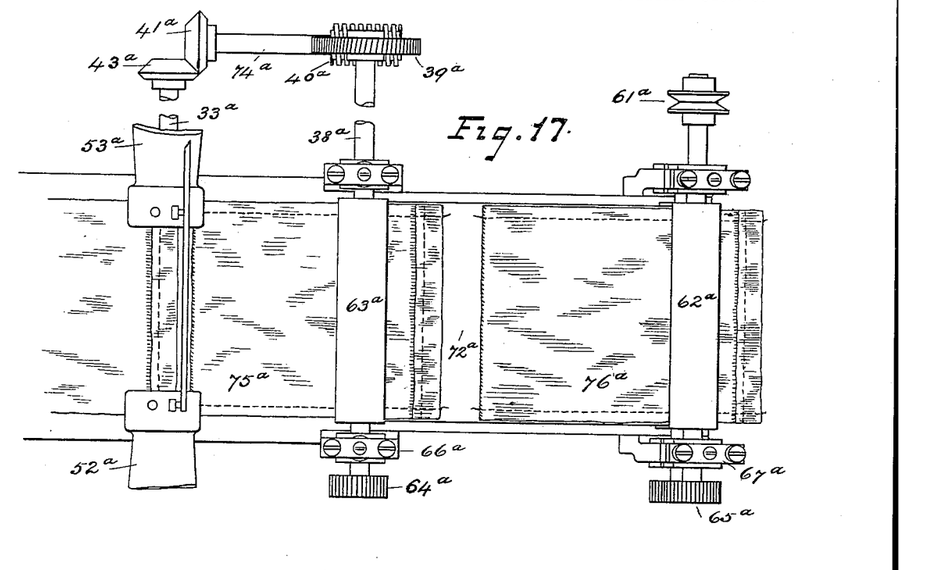
Figure 18:
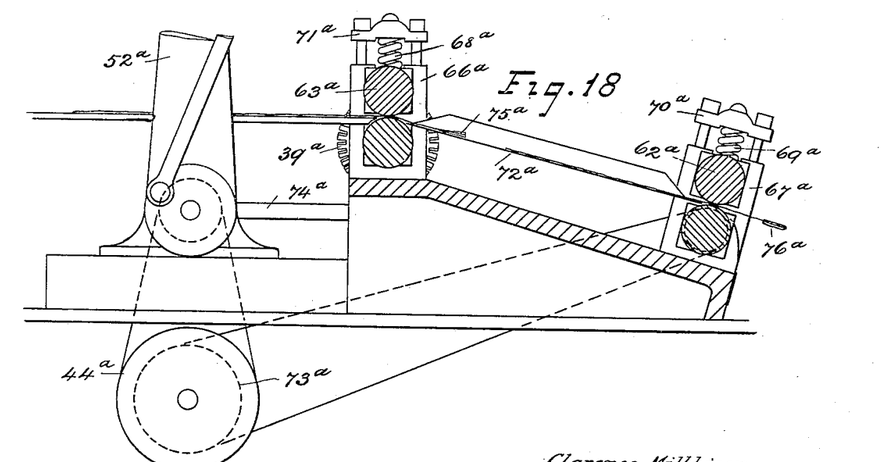
Fig. 18 is an elevation, partly in section, showing the breaker for separating the finished bags from one another after passing through the sewing mechanism and the method of driving the same from the shaft of the sewing mechanism.

In Fig. 15 is shown a modification of the feed-finger 68, wherein the foot has the form shown at $58^a$, the said foot having a roughened or corrugated under surface, as shown in Fig. 16. By using feed-fingers of this form we are enabled to feed the detached portions of folded fabric direct to the sewing mechanism, the feed-bands $19^a$ $21^a$, with their carrying-rollers $18^a$, $20^a$, $29^a$, $30^a$, and $31^a$ and the supports $32^a$, (see Fig. 12,) being entirely done away with. $2^a$ is an alining-guide having slots $59^a$, through which pass the endless bands 40. Now it is necessary that as the detached portions of folded fabric are carried by the bands 40 to the sewing-table $1^a$ they should be properly alined before being engaged by the feed-fingers and fed to the sewing mechanism. We obtain this alinement in the following manner: The bands 40 carry the detached portion of folded fabric forward until it strikes the alining-guide $2^a$; but the said bands 40 continue their motion for a short distance and drive the detached portion of folded fabric up against the guide, thus insuring the perfect contact of the forward edge of the detached portion of folded fabric with the said alining-guide $2^a$. $3^a$ is a guide which can be adjusted according to the width of the bag to be made and which serves to assist in the guiding of the detached portions of folded fabric as they pass through the sewing mechanism. One of the advantauges in thus alining the detached portions of folded fabric is that we are able to sew very close to the edges of the fabric without any risk of the stitches running over the edges. In this way we save a quantity of fabric which is usually lost in wide margins. The part $27^a$ of the sewing mechanism is also adjustable as to its distance from the fixed part $28^a$ of the said sewing mechanism, since the head $53^a$, Fig. 9, in which the part $27^a$ of the sewing mechanism is contained, can be moved closer to or farther away from the head $52^a$, in which the part $28^a$ of the sewing mechanism is contained, the needle-operating bar $36^a$ being so arranged that it will operate the needles whatever their relative positions may be. In these parts $27^a$ and $28^a$ of the sewing mechanism, $27^b$ $27^b$ are the presser-feet and $28^b$ $28^b$ the needles. The feed-dogs, which are of the usual form and by means of which the bags are fed through the sewing mechanism, are not shown. $24^a$ (see Figs. 12 and 14) is a presser-roll which is kept in position by the pins $25^a$ $26^a$ at each end of it and the said enlarged ends of which press upon and so press out any creases or irregularities in the edges of the detached portions of folded fabric as they are fed to the sewing mechanism. This presser-roll is dispensed with when the form of feed-finger shown in Figs. 15 and 16 is used. Now as the completed bags leave the sewing mechanism they are attached successively to one another by the sewing-thread. In order to separate them when using the arrangement of feed-finger shown in Fig. 15, we use the breaking attachment shown in Figs. 17 and 18, wherein the upper roll $63^a$ of the first pair of rolls is given motion by the worm-wheel shaft $38^a$, the lower roll in the said first pair deriving its motion from the upper roll $63^a$ by means of the gears $64^a$. The said first pair of rolls are given such a motion by the worm-wheel shaft $38^a$, the worm-wheel $39^a$, the worm $40^a$, the bevel-gears $41^a$ $43^a$, and the sewing-mechanism shaft $33^a$ that they will feed the line of bags forward at the same rate at which they pass through the sewing mechanism. The second pair of rolls, of which $62^a$ is the upper one, are given a higher rate of speed by means of a cord which passes over the pulley $61^a$ (see Fig. 17) and over the pulley $73^a$, (see Fig. 18,) which is mounted on the counter-shaft from which is driven the sewing mechanism. The first and second pairs of rolls revolve in bearings carried in the housings $66^a$ $67^a$, respectively, pressure being given to the upper roll in each pair by means of the springs $68^a$ and $69^a$ and the caps $70^a$ and $71^a$, respectively. $72^a$ is a table over which the bags move in passing from the first to the second pair of rolls. As soon as a bag $76^a$ has completely passed through the first pair of rolls and the following bag $75^a$ has been grasped by the said first pair of rolls it, the first-mentioned bag, is seized by the second pair of rolls, which, since they revolve at a greater speed than the first pair of rolls, separate the leading bag from that which follows by breaking the threads which connect them together. This is clearly shown in Figs. 17 and 18.

Though it is possible in our machine to use any of the usual forms of stitches, we prefer to use that known as the "single" chain-stitch, thereby not only effecting a great saving in the quantity of sewing-thread used, but also doing away with bobbins and other intricate mechanism. Now in using single chain-stitch it must be remembered that the stitch is not locked at that point at which it leaves the material which is being sewed and can therefore be drawn out if broken at that point. If we fed our bags bottom foremost to the sewing mechanism, the stitches would leave the bags at their mouths, and consequently at the point where greatest strength is required the chain-stitch would be unlocked and would pull out, which would render the bags useless. In order to overcome this disadvantage in the use of the single chain-stitch, we have so arranged our bag-making machine as to feed the detached portions of folded fabric to the sewing mechanism so that the mouths of the completed bags will pass first through the said sewing mechanism. In this way the mouths of the bags are rendered perfectly strong. One of the elements of utility in our machine lies in the fact of its capacity to thus present the open ends of the bags to the sewing mechanism.

While we prefer to construct our machine as shown in the accompanying drawings, we do not confine ourselves to the methods of actuating the several elements or to the details of construction shown therein.

Having now described our invention, what we claim, and desire to protect by Letters Patent of the United States, is—

1. In a bag-making machine, the combination of folders to fold the fabric, intermittently-acting feed-rolls to feed the folded fabric to cutters, a presenting-roll located close to the knife and running constantly and at a speed greater than that of the feed-rolls to smooth out and keep flat the folded fabric as it passes to and as portions are being detached from it by the cutters, means for operating the presenting-roll, cutters to detach portions from the folded fabric, an alining device to aline the detached portions of fabric with sewing mechanism, feed-fingers acting with a reciprocating motion and having self-adjusting feet adapted to engage and feed the portions of folded fabric successively to the sewing mechanism, and sewing mechanism adapted and arranged to sew the sides of the detached portions of folded fabric.

2. In a bag-making machine, the combination of folders to fold the fabric, intermittently-acting feed-rolls to feed the folded fabric to cutters, a presenting-roll located close to the knife and running constantly and at a speed greater than that of the intermittently-acting feed-rolls to smooth out and keep flat the folded fabric as it passes to and as portions are being detached from it by the cutters, and cutters to detach portions from the folded fabric.

3. In a bag-making machine, the combination of a guide-frame to guide the fabric as it advances to the folders, finger-guides to regulate and control the commencement of the fold, and an adjustable registering-folder.

4. In a bag-making machine, the combination of a guide-frame to guide the fabric as it advances to the folders, finger-guides to regulate and control the commencement of the fold, an adjustable registering-folder, and an adjustable creasing-folder.

5. In a bag-making machine, the combination of intermittently-acting feed-rolls, cutters adapted and arranged to cut folded fabric fed by the feed-rolls, and a presenting-roll running constantly and at a speed greater than that of the feed-rolls to smooth out and keep the folded fabric flat as it is fed by the feed-rolls to and as portions are being detached from it by the cutters, and located between the said feed-rolls and the said cutters, and close to the latter.

6. In a bag-making machine, the combination of cutters to cut portions from the folded fabric, means for operating the cutters, an alining device consisting of an intermittent feed mechanism adapted and arranged to carry the detached portions of folded fabric successively to an alining-guide, and an alining-guide located in the path of the intermittent feed mechanism and adapted to stop and by the continued motion of the said feed aline with sewing mechanism the detached portions of folded fabric, and sewing mechanism adapted and arranged to sew the sides of the detached portions of folded fabric.

7. In a bag-making machine, cutters adapted and arranged to detach portions from the folded fabric, and means for operating the cutters, in combination with an alining device consisting of an intermittent feed mechanism adapted and arranged to carry the detached portions of folded fabric successively to an alining-guide, and an alining-guide located in the path of the intermittent feed mechanism and adapted to stop and by the continued motion of the said intermittent feed mechanism aline with sewing mechanism the detached portions of folded fabric, feed-fingers acting with a reciprocating motion and having self-adjusting feet adapted to engage and feed the portions of folded fabric successively to the sewing mechanism, and sewing mechanism adapted and arranged to sew the sides of the detached portions of folded fabric.

8. In a bag-making machine, the combination of feed-fingers acting with a reciprocating motion and having elastically connected with them self-adjusting feet adapted to press downward with an elastic contact upon and so engage portions of fabric to feed the said portions of fabric successively to sewing mechanism when the feed-fingers advance, means for operating the feed-fingers, and sewing mechanism adapted and arranged to sew the sides of the detached portions of folded fabric.

9. In a bag-making machine, the combination of feed-fingers to feed portions of fabric successively to a sewing mechanism, means for operating the feed-fingers, a sewing mechanism adapted and arranged to sew the sides of the portions of fabric, and a presser-roll situated between the feed-fingers and the sewing mechanism and adapted and arranged to ride upon the edges of the portions of fabric as they pass beneath it to straighten out the said edges before they are sewed.

10. In a bag-making-machine, the combination of a guide-frame to guide the fabric as it advances to the folders, finger-guides to regulate and control the commencement of the fold, an adjustable registering-folder to register the edges of the folded fabric, and feed-rolls to feed the fabric to the finger-guides and the registering-folder.

11. In a bag-making machine, the combination of a guide-frame to guide the fabric as it advances to the folders, finger-guides to regulate and control the commencement of the fold, an adjustable registering-folder, an adjustable creasing-folder, and feed-rolls to feed the fabric to the finger-guides and the adjustable folders.

12. In a bag-making machine, the combination of finger-guides to regulate and control the commencement of the folding of the fabric, the adjustable registering-folder, the adjustable creasing-folder, the intermittent feed-rolls to feed the fabric to the folders and the folded fabric to the cutters, the presenting-roll located close to the cutters and running constantly and at a speed greater than that of the feed-rolls to smooth out and keep flat the folded fabric as it passes from the feed-rolls to the cutters, cutters to detach portions from the folded fabric, an alining device consisting of an intermittent feed mechanism and an alining-guide, the intermittent feed mechanism being adapted and arranged to carry the detached portions of folded fabric successively to the alining-guide, and the alining-guide being located in the path of the intermittent feed mechanism and being adapted to stop and by the continued motion of the said intermittent feed mechanism aline with sewing mechanism the detached portions of folded fabric, feed-fingers acting with a reciprocating motion and having self-adjusting feet adapted to engage and feed the portions of folded fabric successively to the sewing mechanism, and sewing mechanism adapted and arranged to sew the sides of the detached portions of folded fabric.

13. In a bag-making machine, the combination of an alining device consisting of an intermittent feed mechanism and an alining-guide, the intermittent feed mechanism being adapted and arranged to carry detached portions of fabric to the alining-guide, and the alining-guide being located in the path of the intermittent feed mechanism and being adapted to stop and by the continued motion of the said intermittent feed mechanism aline with sewing mechanism the detached portions of fabric, feed-fingers acting with a reciprocating motion and having self-adjusting feet adapted to engage and feed the portions of fabric successively to the sewing mechanism, a presser-roll located between the feed-fingers and the sewing mechanism and adapted and arranged to ride upon the edges of the portions of fabric as they pass beneath it to straighten out the said edges before they are sewed, and the sewing mechanism adapted and arranged to sew the edges of the portions of fabric.

Signed by us, at Richmond, this 17th day of February, 1898.

CLARENCE MILLHISER.
CHARLES LUDWIG ADOLPH DOEPPE.

Witnesses:
PHILIP C. SCHLOSS,
ARTHUR SCRIVENER.